April 9, 1963  I. K. E. JOHANSSON  3,084,978
HEAD RESTS
Filed Feb. 15, 1960
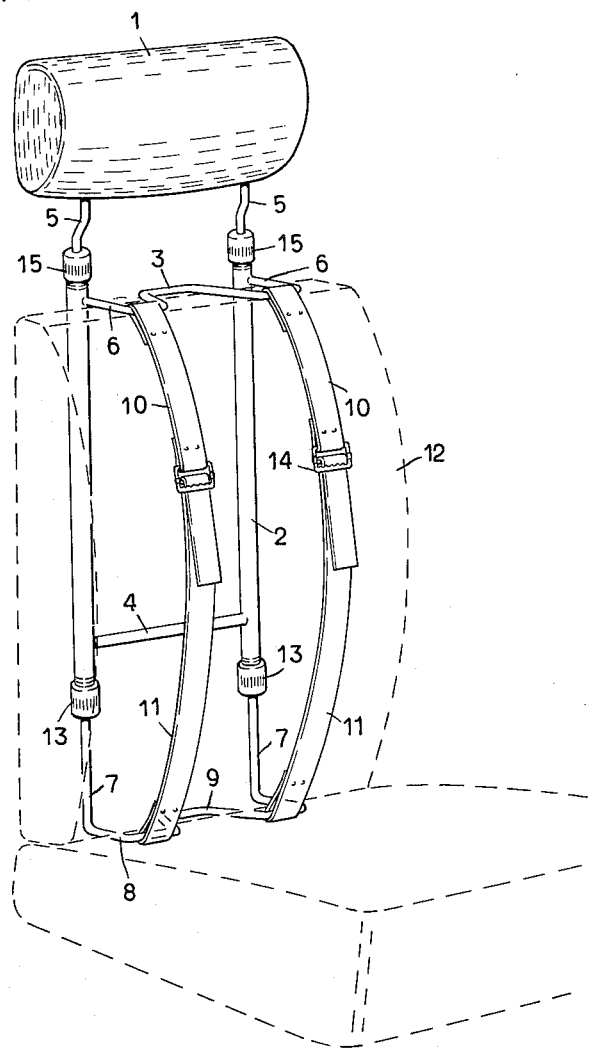
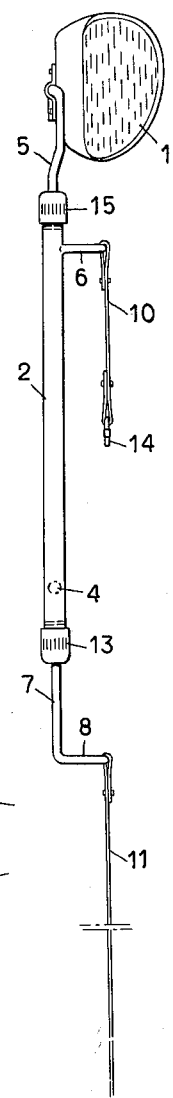

United States Patent Office 3,084,978
Patented Apr. 9, 1963

3,084,978
HEAD RESTS
Ingemar Karl Eric Johansson, Ringvagen 45,
Tranas, Sweden
Filed Feb. 15, 1960, Ser. No. 8,596
2 Claims. (Cl. 297—397)

This invention relates to improvements in head rests to be used in connection with vehicle seats or the like.

Known head rests are attached to the back of a seat only by means of fastening straps eventually combined with frame means to be hooked on the top of the back. Such head rests will easily loosen from the back and slip to the side or backwards and they cannot be vertically adjusted to adapt them for persons of different length.

An object of the invention is to provide such attaching means by which the rest can be safely fixed to the back. For this purpose said rest comprises a clamping frame, on said frame forwards protruding arms adapted to guide against top and bottom edges of a back of a seat, when placing the frame on the rear side of the back, and straps attached to said arms and provided with fastening means, so that the top arms may in front of the back be joined to said bottom arms by the straps.

In the accompanying drawing, which forms part of the specification, FIGURE 1 is a perspective front view of my device. FIGURE 2 is a side view of the device.

In FIGURE 1 I have shown my device attached to the back 12 of any suitable seat assembly, said seat assembly being shown by lines of short dashes. The head rest 1 is carried by a clamping frame 2 consisting of two vertical tubes, which are held at a fixed space from another by cross bars 3 and 4. The head rest is screwed on two vertical bars 5, which from above are inserted in the tubes 2 and fixed in wanted position by means of suitable holders 15. The top cross bar 3 connects forwards from the tubes protruding top arms 6. Other vertical bars 7 are from below inserted in the bottom portions of the tubes 2, the bottom portions of said bars being bent forwards to form bottom arms 8, which are joined together by a cross bar 9. In the cross bars 3 and 9, joining the top and bottom arms respectively, fastening straps 10 and 11 respectively are attached, the ends of said straps having suitable clasping means 14, by which the straps 10 can be attached to the straps 11.

When the device is to be attached to the back 12 of a seat one has to approach the device to the back from behind with the arms 6 guiding against the top and the arms 8 against the bottom edges of the back. For this purpose in advance the lower bars 7 are to be pulled out to a suitable length of the tubes 2, until the distance between the arms 6 and 8 corresponds to the height of the back. After reaching this position one has to fix the bars 7 to the tubes by a suitable holder 13 consisting of clasping nuts and a rubber bushing inside the nut to be compressed against the tube end in question. The straps 10 and 11 are then joined together at the front side of the back by the clasping means 14 and tightened. By means of similar holders 15 as the holders 13 the back rest 1 is fixed in a suitable position.

Due to the clamping frame 2 and the protruding arms 6 and 8 the head rest will be firmly attached and a vertical adjustment possible.

What I claim is:
1. A head rest device for vehicle seats comprising an elongated clamping frame, said clamping frame comprising a plurality of laterally spaced tubes disposed longitudinally upward along the rear side of the upright back portion of a vehicle seat, upper and lower cross members, said upper and lower cross members respectively connecting the tops and bottoms of the spaced tubes together, said upper cross member forming forwardly bent arm portions spaced from one another and extending forwardly across the top of the upright back portion toward the front side of the back portion, said upper cross member having its intermediate portion between said arm portions extending rearwardly, adjustable connections at each of the bottom ends of said laterally spaced tubes, with said lower cross member having its remote ends mounted to said adjustable connections, said lower cross member forming forwardly bent arm portions spaced from one another and extending forwardly across the top of the upright back portion toward the front side of the back portion, said lower cross member having its intermediate portion between said arm portions extending rearwardly, strap means connected to the remote ends of said arm portions and extending across the front side of the back portion, and a head rest cushion disposed above and mounted on said clamping frame.
2. A head rest device according to claim 1, wherein said head rest cushion is provided with a plurality of spaced downwardly extending portions which are inserted in and adjustably settable to the top ends of the tubes.

References Cited in the file of this patent
UNITED STATES PATENTS

| | | |
|---|---|---|
| 1,597,355 | Fussell | Aug. 24, 1926 |
| 2,056,479 | Newman | Oct. 6, 1936 |
| 2,490,088 | Penn | Dec. 6, 1949 |
| 2,756,808 | Eichorst | July 31, 1956 |